(12) United States Patent
Yan et al.

(10) Patent No.: US 8,180,917 B1
(45) Date of Patent: May 15, 2012

(54) PACKET THRESHOLD-MIX BATCHING DISPATCHER TO COUNTER TRAFFIC ANALYSIS

(75) Inventors: Wei Yan, San Jose, CA (US); Handong Wu, San Jose, CA (US)

(73) Assignee: Trend Micro, Inc., Tokyo (JP)

( * ) Notice: Subject to any disclaimer, the term of this patent is extended or adjusted under 35 U.S.C. 154(b) by 350 days.

(21) Appl. No.: 12/361,373

(22) Filed: Jan. 28, 2009

(51) Int. Cl.
*G06F 15/173* (2006.01)
*G06F 15/16* (2006.01)
*G06F 11/00* (2006.01)

(52) U.S. Cl. ........... 709/234; 709/200; 709/224; 726/22

(58) Field of Classification Search .................. 709/224, 709/200, 234; 726/22
See application file for complete search history.

(56) References Cited

U.S. PATENT DOCUMENTS

| | | | | |
|---|---|---|---|---|
| 2002/0042823 | A1* | 4/2002 | DeBettencourt et al. | 709/224 |
| 2006/0088207 | A1* | 4/2006 | Schneiderman | 382/159 |
| 2009/0219395 | A1* | 9/2009 | Baker et al. | 348/180 |
| 2011/0117952 | A1* | 5/2011 | Burstrom et al. | 455/522 |

OTHER PUBLICATIONS

Shmatikov et al., Timing analysis in low-latency mix networks: Attacks and defenses, 2006 http://www.cs.utexas.edu/~shmat/shmat_esorics06.pdf.*

Cheng et al., On-Demand Link Padding in Traffic Anonymizing, 2005, http://www.eecs.harvard.edu/~htk/publication/2005-jit-cheng-kung-tan.pdf.*

Wei Yan and Edwin Hou; "Defending Against Traffic Analysis Attacks with Link Padding for Bursty Traffics"; 2004 IEEE; Workshop on Information Assurance; pp. 46-51.

* cited by examiner

*Primary Examiner* — Joseph Avellino
*Assistant Examiner* — James Conaway
(74) *Attorney, Agent, or Firm* — Beyer Law Group LLP

(57) ABSTRACT

An antivirus agent located on a user computer, local area network or standalone hardware device includes a statistical module, a control unit, a timeslot generator and a dispatcher. The statistical module calculates statistics for incoming request packets including the burstiness degree H. A number of normal distributions are predefined. A number of probability sequences are predefined. An input statistic is used to select one of the probability sequences. This probability sequence is used to select a timer value from the distributions. Packets are loaded into a variable-length buffer in the dispatcher to form the timer expires or when the buffer is full. The rate of the output traffic from the dispatcher depends upon a selected distribution value by the timeslot generator and not by any manufactured timing by an attacker. Output traffic frequency is shaped by the dispatcher; packets may go out faster or slower, thus thwarting an attacker who relies upon their own inserted packet timing.

29 Claims, 7 Drawing Sheets

Anti-virus In-the-Cloud Infrastructure

Network Under Traffic Analysis Attack

AV Agent Architecture

Packet Threshold-Mix Batching Dispatcher

PACKET THRESHOLD-MIX BATCHING DISPATCHER TO COUNTER TRAFFIC ANALYSIS

FIELD OF THE INVENTION

The present invention relates generally to defending against malicious computer-based attacks. More specifically, the present invention relates to a defense for traffic analysis of an Internet-based "in-the-cloud" service.

BACKGROUND OF THE INVENTION

The so-called anti-virus ("AV") "in-the-cloud" service has been advocated as a next generation model for virus detection. It is a software distribution model in which security services are hosted by vendors and made available to customers over the Internet.

This approach employs a set of "cloud" (i.e., Internet) servers which analyze and correlate new attacks and generate vaccinations online. With this infrastructure, in-the-cloud service can sharply reduce the computing burden on client computers, and make security products more effective in stopping new malware. Furthermore, customers do not need to install a full copy of the virus signature file, and need only keep a small set of "cloud signatures." The benefits include easy deployment, low cost of operation, and fast signature updating.

In operation, the in-the-cloud service can work as follows. For a suspicious file identified on a user computer, rather than the typical client-based virus signature scanning, the desktop application instead calculates the hash value of the file and sends it to the remote cloud server, which will then compare that value to the continuously updated signature database available at the cloud server. If the value exists in the database, the client will be asked what specific action he or she wants the desktop application to take on the infected file. For example, a user can choose to quarantine, block, or even clean the detected file.

AV cloud services become more attractive attack targets because putting a cloud server cluster offline is more disastrous than compromising a single machine. Therefore, preventing cloud servers from being attacked has become a critical issue. The communication link between a desktop and a cloud server is over the Internet and is vulnerable if the link is offline or unavailable. To defend against technical network attacks, cloud servers can hide their identities via cryptography and anonymity but still are vulnerable to traffic analysis. By using statistical analysis coupled with traffic analysis, an attacker can determine the next node to which packets will be sent. With the gained link information, the attacker can launch a denial-of-service attack on the cloud servers.

FIG. 1 shows a typical anti-virus in-the-cloud infrastructure 10. Shown is a user computer 20, an anonymous network 40 and an in-the-cloud service 50. Anonymous networks are used to provide private and secure communications for a variety of applications. One important feature an anonymous network provides for an in-the-cloud service is that a server can communicate with a user without releasing its real identity. Using an anonymous network to send out a packet containing a hash value of a suspicious file, the desktop software chooses a set of authorized anonymous nodes and incrementally creates an encrypted circuit to a cloud server. Since each anonymous circuit is extended one node at a time, a node in the link only knows the immediately previous and following nodes. Thus, an eavesdropper on a compromised node cannot determine the complete link information between the desktop application and the cloud server.

Generally speaking, anonymous networks fall into two categories: high-latency and low-latency networks. A big drawback, however, of a high-latency network is that it will introduce long delivery delays.

On the contrary, low-latency anonymous networks are suitable for interactive applications such as web browsing and online chatting. In an in-the-cloud service, the communication between a desktop and a server over the Internet requires as little as hundreds of milliseconds, which requires especially low latency. These low-latency networks can be susceptible to traffic analysis.

Even with an anonymous network 40 as shown in FIG. 1, an attacker can use a traffic analysis. In this type of attack the attacker inserts probing traffic into the network (usually by compromising a user computer) that has a unique pattern and timing. Thus, the user computer is sending normal packets as well as malicious probing packets. This probing traffic can be distinguished by the attacker as the traffic travels through the routing nodes of the network. The attacker can then figure out which routing nodes are used and which are next, thus being able to determine the path between the desktop agent and the cloud server 60. An attack may then be launched on the server (such as "denial of service") causing instability in the service, etc. Attacks may also be launched upon the intermediate nodes as well.

Defending against Traffic Analysis Attacks with Link Padding for Bursty Traffics, Proceedings of the 2004 IEEE Workshop on Information Assurance, June 2004, describes a technique to defend against traffic analysis using a link padding algorithm. But, this paper is directed toward defending against an adversary having a global view who can observe the entire network, rather than an adversary who can only observe part of the network. An adversary attacking a low-latency anonymous network may only need to view and control a user computer and the first anonymous node. Further, this paper aims to protect the links between intermediate routing nodes, and it requires both a traffic buffer and a constant-length buffer. Finally, its timer is only dependent upon the timeout generator.

It is desirable to defend against traffic analysis used against in-the-cloud services, especially with a low-latency network.

SUMMARY OF THE INVENTION

To achieve the foregoing, and in accordance with the purpose of the present invention, a packet dispatcher is disclosed that thwarts traffic analysis.

The present invention uses a novel threshold-mix batching dispatcher which sends all packets either singly or by batch based on the customer's networking configuration and input traffic statistics. The dispatcher will hold packets in a buffer until the number of packets is above a certain time threshold, and then send the packets out all at once.

The packet dispatcher attempts to modify communication streams (in order to make them statistically indistinguishable by a hacker) by waiting until a variable number of messages have arrived and then sending them out all at once. No traffic buffer nor a constant-length buffer are needed, instead, only a variable-length buffer is used. Furthermore, using a novel packet timeslot generator, the invention can dynamically adjust the sending frequency without negatively effecting the network latency. Packets are sent when a variable timer expires or when the variable-length buffer is full. More specifically, the invention dynamically calculates the mean value of inter-arrival time series of incoming packets, and then uses this mean value to indirectly determine timeout values for sending packets from the buffer. Therefore, the network latency is negligibly affected. For example, suppose there are four packet requests, and these arrive one-by-one with delays of 0.1 minute, 0.2 m, 0.3 m and 0.5 m between the requests. These time delay values are the inter-arrival values of these four packets. The mean value is thus (0.1+0.2+0.3+0.5)/4. Of course, the mean value may be calculated differently, or another statistic dependent upon the arrival times of incoming packets may be used to determine timeout values for sending packets.

The present invention reshapes the inserted probing traffic to make it appear similar to the normal traffic so that the attackers cannot then determine node locations, paths or routes in the anonymous network. I.e., the probing traffic is made similar to other traffic so that the hacker cannot observe the probing traffic as it passes through the anonymous network. The invention affects the dispatching of network packets from the user computer, thus affecting both the normal user packets and malicious probing network packets inserted by a hacker.

For example, a hacker may rely upon the timing of probing packets inserted into a compromised computer or node to determine the location of cloud servers. By using the invention to delay or speed up the timing of sending out packets, the attacker cannot then determine the location of nodes and servers by analyzing the progress of the probing packets. In other words, an antivirus agent is able to change the rate of sending packets out over the network.

The invention thus hides the locations of AV web-scanning servers from attackers who are attempting to use traffic analysis. The invention protects the routing links between customers and cloud servers and hides servers from attacks and is especially useful with a low-latency anonymous network where an attacker can view only portions of the network.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As discussed above, the ever-increasing malware variants challenge the traditional anti-virus protection models, thus demanding constant signature updates, large signature databases and resource guzzling security products. As a next-generation security infrastructure designed to defend virus threats, an AV in-the-cloud service moves the virus-scanning functionality from the desktop into the Internet.

Figure 1:
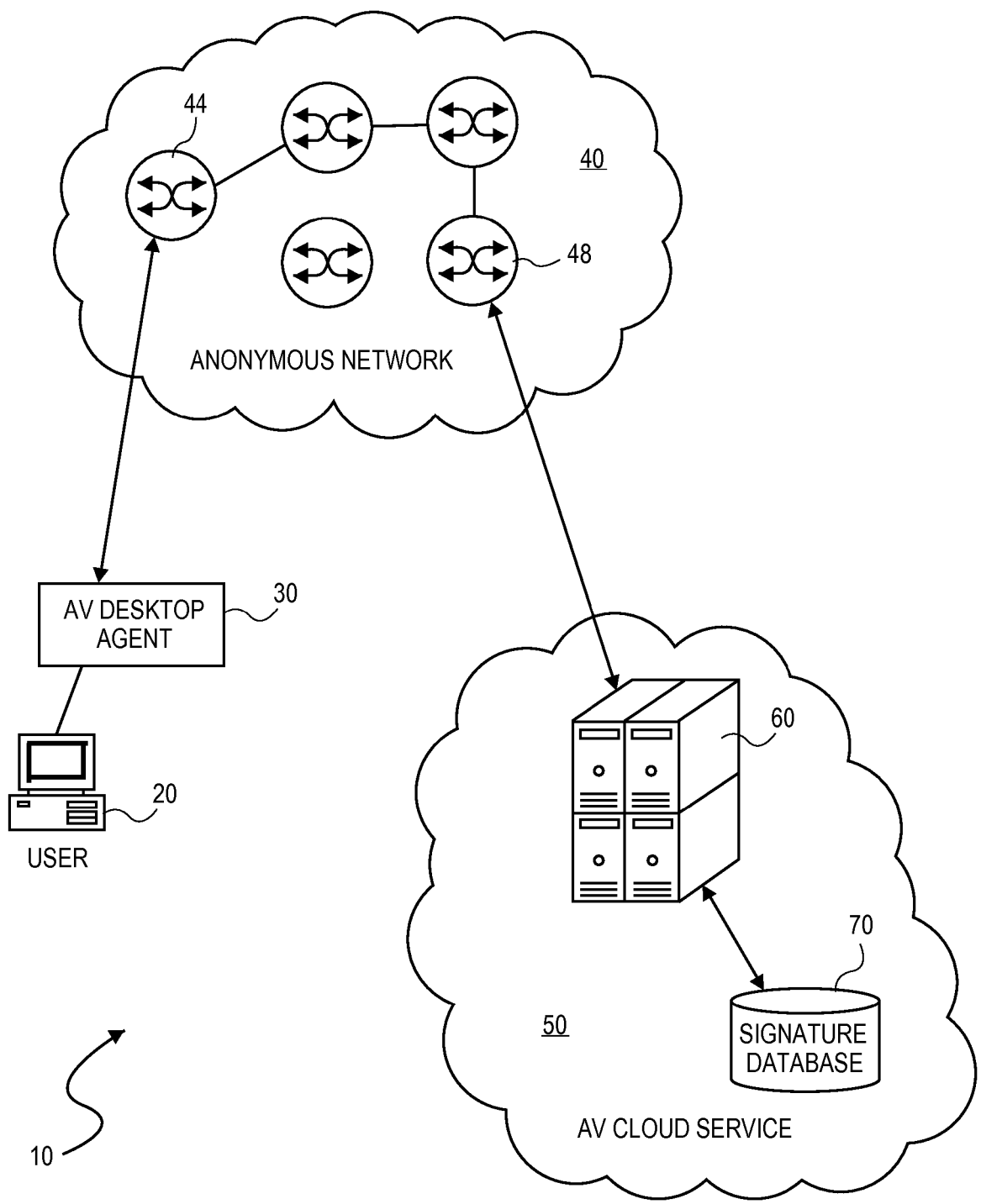
FIG. 1 shows the architecture of an AV in-the-cloud infrastructure.

FIG. 1 shows the architecture of an AV in-the-cloud infrastructure 10. The AV agent 30 is a scanner deployed at the desktop computer with extra functionality as described below. It places itself between the applications and the operating system. As a result, the AV agent automatically examines the local machine's memory and file system whenever these resources are accessed by an application. For any suspicious file, the agent generates the hash value (or a specific signature of the file) and sends it to the remote cloud server 60 for security verification. A suspicious file may be identified on a local computer by a local signature database, a local cache, by an emulator, by executing samples of the suspicious file, by applying AV rules, etc. Any suitable hash algorithm may be used. Typically, algorithms such as CRC, MD5, SHA-1 and SHA-2 are used. The hash values (or even the file itself) are sent over the Internet using network 40 (or any other suitable network) by sending the data in packets, as is known in the art.

Servers 60 perform traditional AV analysis and protection, database 70 includes virus patterns, hash values of known viruses, etc. A low-latency anonymous communication network 40 is used to forward the packets from the desktop to the AV cloud service 50. The network 40 distributes a set of trusted anonymous hops where a layer of encryption can be added or removed if desired.

The circuit through the network 40 is built from the user one step at a time. The entry point 44 sends a request to the first hop to extend the circuit. When the circuit is set up, it is used to relay data. The last router in the path is called the exit node 48. When a packet reaches the first node in the path, the node decrypts the routing information to the next hop, and the encrypted data for that hop. This process is repeated until the packet reaches the exit node 48. Various security vendors have different approaches to implement cloud-based desktop products and variations from FIG. 1 are possible. The purpose of network 40 is to hide the location of the cloud service 50 (and the nodes of the network) so it cannot be attacked. But even when messages are encrypted, network 40 is subject to attack.

Unfortunately, even anonymous networks are subject to a traffic analysis by a hacker. Traffic analysis is a means of gleaning useful information from a message (or packet) without knowledge of the content of the message itself. Various bits of information about the sender, receiver, mode, frequency, timing, and length of the message in question are used in traffic analysis. Once traffic analysis has been used to determine nodes in the anonymous network, a low-cost denial of service attack can be used to negatively affect the quality of anonymity by significantly delaying data traversing the anonymous communication network.

By compromising a few anonymous nodes in the network, an attacker can infer the communication links used to relay the streams of AV web-scanning request packets and then reduce the anonymity. Such selective denial of service is easier to carry out than an attack on the entire network and can be more effective: instead of driving users away from the system, users are presented with a less reliable, but still functional system. Faced with poor reliability, many users (and a lot of software) will naturally attempt the communication again, presenting more opportunities for attack.

Figure 2:
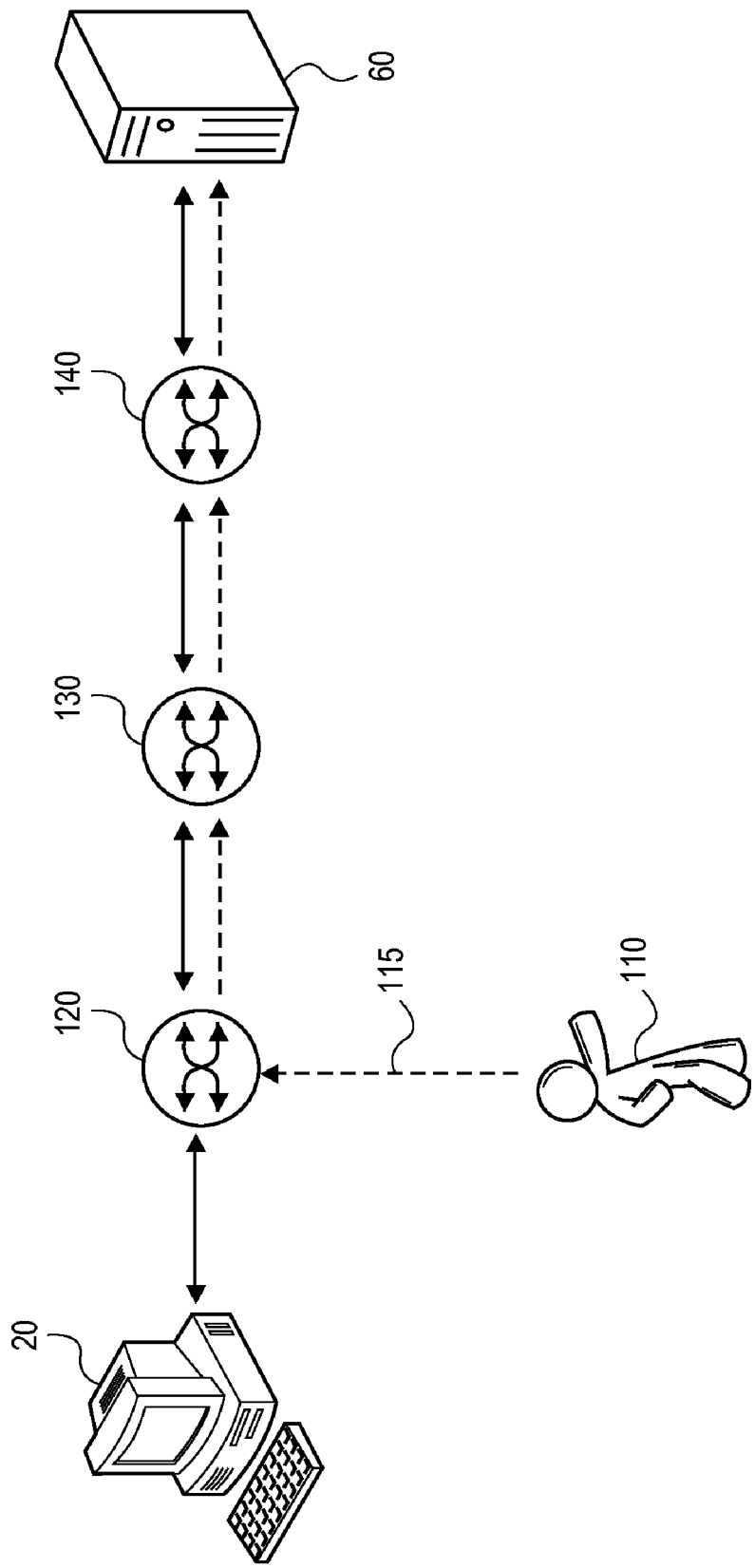
FIG. 2 illustrates a simple network undergoing traffic analysis by a hacker.

FIG. 2 illustrates a simple network undergoing traffic analysis by a hacker. Shown is a user computer 20, an internet server 60, and any number of intermediate nodes 120-140. Typically, computer 20 sends requests over the Internet for more scanning or analysis of computer files or hash values of files that it sends to an in-the-cloud service. Its agent 30 handles the requests and sends the communication packets. Or, any number of computers in a LAN 24 use a single AV agent (or perhaps a few) to handle requests for all the computers.

A hacker 110 attempts traffic analysis by injecting probing traffic 115 into a compromised or corrupted node 120. Alternatively, the probing traffic may be injected into computer 20. Any success depends upon the attacker's ability to observe an anonymous network. Generally, security vendors deploy the AV cloud service centers around the world (these centers are managed either by vendors or by ISPs). It can be assumed that hackers only have a partial view of the whole network. But, a hacker has the ability to compromise a node at the edge of the anonymous network. A vulnerability of a low-latency network is that the short delay cannot significantly scramble the timing signatures of the traffic flow. Thus, by observing traffic between a desktop computer and the network edge, a local attack can trace back to the entrance node of the anonymous network. Unfortunately, low-cost denial of service attacks can work on low-latency anonymous networks. Once a denial of service attack is successful, the anonymity of the network may be reduced considerably. By compromising a few selected anonymous nodes, an adversary can apply a low-cost denial of service to significantly delay the packets traversing the anonymous network, lower the quality of anonymity, and thus provide more chances for traditional network attack methods.

Messages and packets may be encrypted when sent from computer to cloud server, but because traffic analysis does not rely on knowledge of the actual content of a given message, traffic analysis is especially useful in getting around the obstacle posed by encrypted communications. Use of SSL can be useful, but it does not disturb timing and length so it cannot efficiently guard against traffic analysis.

Agent Architecture

Figure 3:
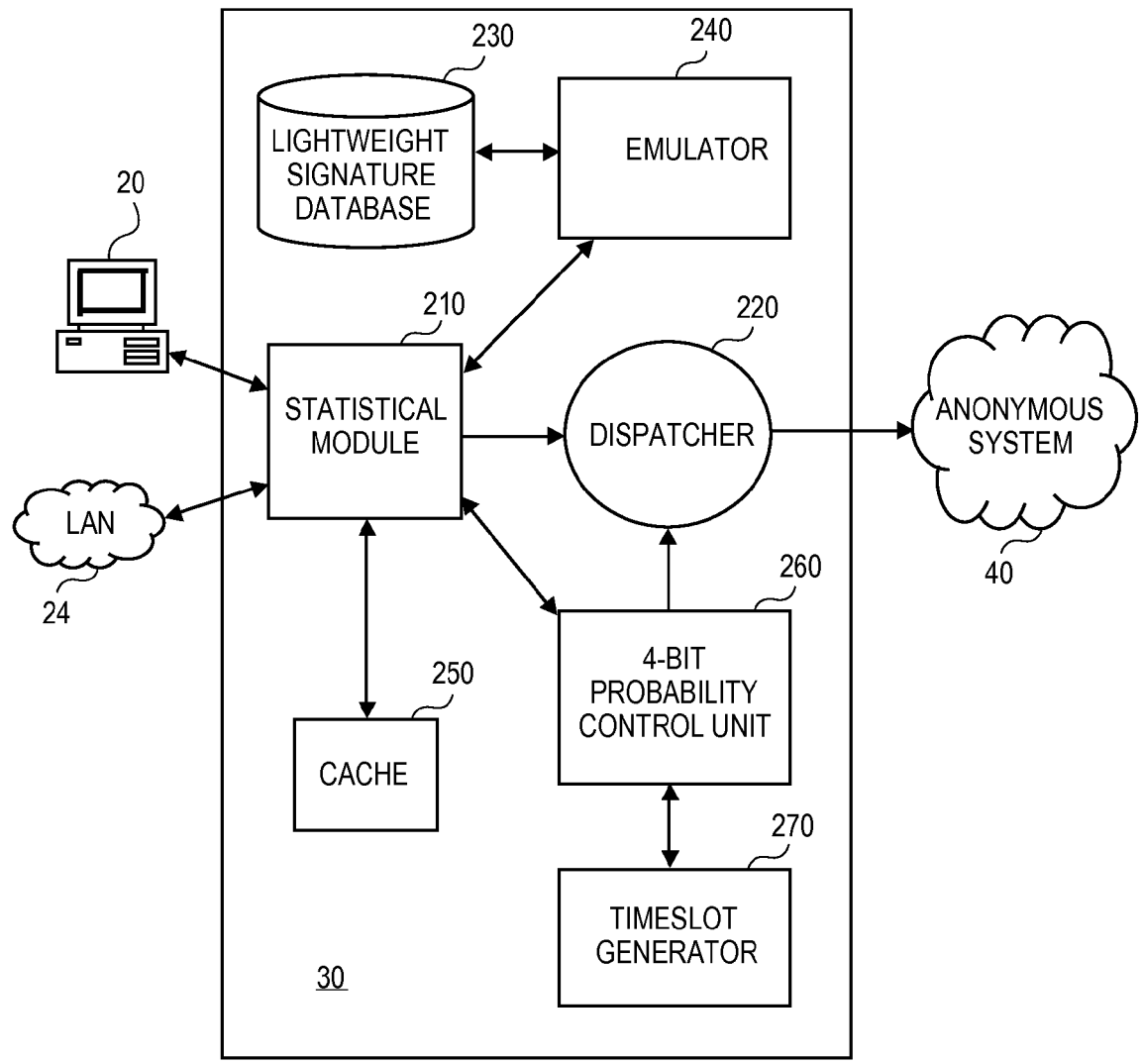
FIG. 3 shows the architecture of the AV agent.

FIG. 3 shows the architecture of the AV agent 30. The agent is a software module part of computer 20, incorporated in a LAN 24, or part of a separate computing device as will be appreciated by one of skill in the art. The statistical software module 210 in the agent first collects the hash values from users identifying computer files that appear suspicious. These users can be either single distributed users or locally networked users. Module 210 also calculates features of input packets such as mean, average per minute, in general, the statistics of traffic input by each user to determine the frequency of the traffic.

Preferably, agent 30 first checks cache 250 to determine if the present hash value is present in the cache. The cache contains only known hash values of known malicious files (whether returned from cloud service 50 in response to a request from the user, or whether populated by the cloud service at its own initiative); therefore, if the present hash value is found in the cache, agent 30 immediately responds to the user computer that the suspect file is in fact malicious and there is no need to send the request over the Internet. Thus, the cache is searched first to determine if these values are present. If the hash values are found in the cache, the agent simply returns the cached result to inform the user that the requested suspicious file is malicious. I.e., a found hash value indicates the file is likely malicious.

Otherwise, module 210 will search for the hash value in the local lightweight signature database 230. In order to keep a balanced workload balance between the desktop computer and the cloud server 60, we implement the lightweight signature database 230 with a size on the order of many times smaller than traditional signature databases. Preferably, database 230 also includes tables of hash values of known malicious files.

Optionally, an advanced agent may have an emulator 240 that includes programs to execute or emulate suspicious encrypted executable files until they are fully decrypted in memory. Nowadays, to evade malicious content detection, virus authors use binary tools to instigate code obfuscation, which has become a common method to bypass AV security products.

The dispatcher 220 outputs input traffic packets to be sent over the network and sends them according to particular timing as described below. Dispatcher 220 is typically a software application which is deployed at the output interface of the agent. The dispatcher includes the buffer to hold packets and the timeout trigger.

The control unit 260 may be a 4-bit (for example) software probability unit that determines which values in a single probability sequence mix to use when selecting a timeout value using the four distributions (for example). Each of these four bits is used as a software switch (i.e., 0 or 1). As a result, bits in the "on" position will then indicate one of the four values in the probability sequence to use. Because there are four values in a single probability sequence mix (each representing one of the distributions), we choose four-bit. For example, using the below example where the probability sequence is "0.1, 0.15, 0.05, 0.7," this means that the 4-bit control vector is (1, 1, 1, 1) because each location in the sequence is non-zero. The invention will then pick a value as the timeout value from among the distributions whose control values are not zero.

For example, the invention may be predefined to include a probability sequence dictating 10% of the values from distribution 1, 15% of the values from distribution 2, 5% of the values from distribution 3, and 70% of the values from distribution 4 (thus, a probability sequence of "0.1, 0.15, 0.05, 0.7"). The invention thus switches between sequences (depending upon H) and provides a single sequence to the timeslot generator.

The unit may also change distributions to fit with the input traffic. For example, at each selected time point, such as every 20 minutes, the statistical module calculates H, the traffic burstiness degree, and the mean value of inter-arrival time series of incoming packets. The Normal distribution is defined as described below where $\mu$ is the mean. The dispatcher then uses the calculated mean value as $\mu$ to generate new normal distributions, and uses H to decide which probability sequence mix to use in order to choose a timeout value. Preferably, the normal distributions share the same $\mu$ value. Based on the newly-calculated H, a new probability sequence mix is selected as well as $\mu$.

The timeslot generator 270 holds values from the four distributions (or has access to the distributions). It uses one value from one of the distributions (based upon the selected probability mix sequence) as a timeout or timer, with which to send the next packet out. Thus, any hacker attempting to send probing packets on a regular frequency will be thwarted by the use of this generator that scrambles the timing of sending packets. The generator mixes the values from the four distributions using the probability sequence selected by the 4-bit control unit to determine which value to use next from one of the distributions.

Packet Threshold-Mix Batching Dispatcher

Figure 4:
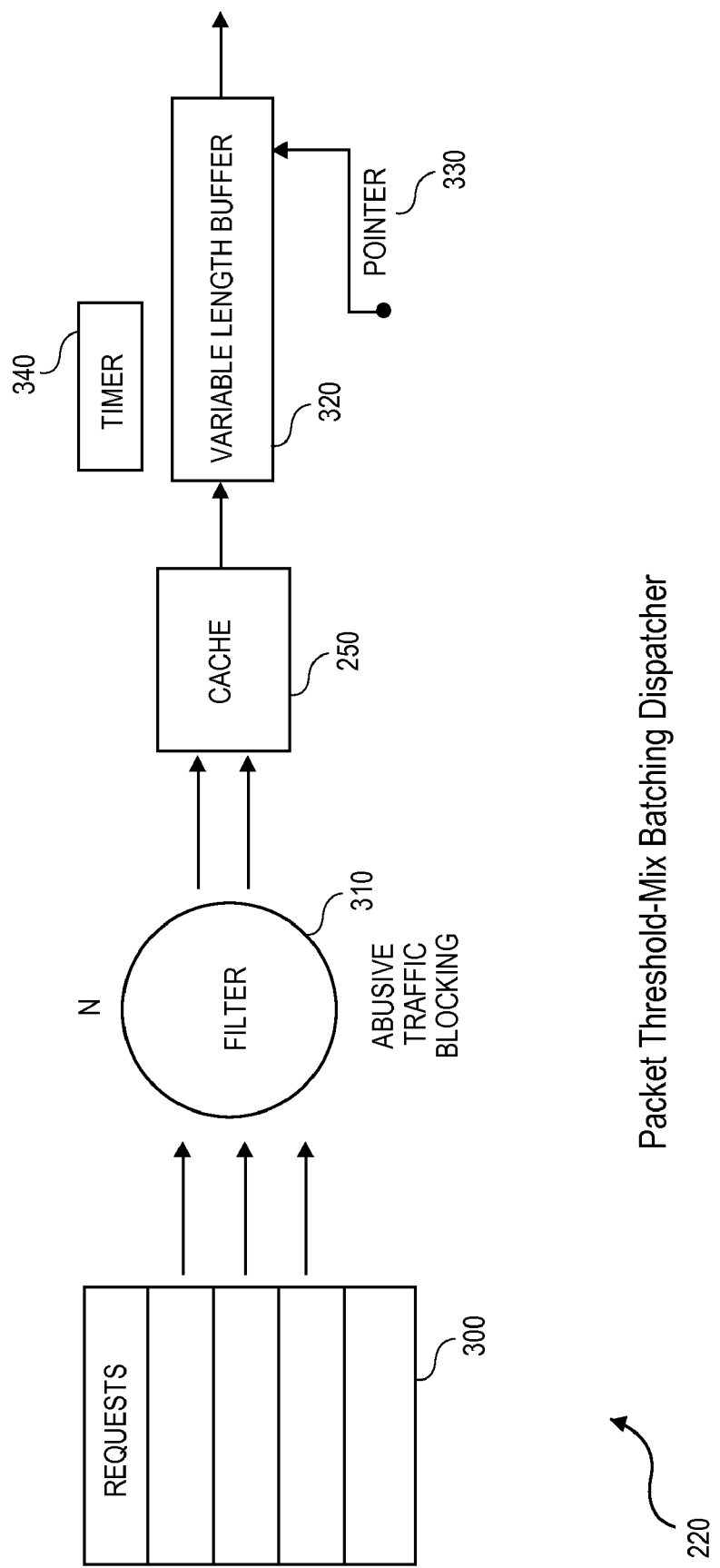
FIG. 4 shows the incoming packets, filter, cache and dispatcher in more detail.

FIG. 4 shows the incoming packets, filter, cache and dispatcher 120 in more detail. Dispatcher 220 includes timer 340, variable length buffer 320 and pointer 330.

A countermeasure against traffic analysis is to use a threshold-mix batching strategy that waits until a variable number of requests have arrived and then sends them out at once. The agent can thus reshape the traffic patterns through the links in the anonymous network 40 to the cloud server 60, thus making traffic analysis by a hacker much more difficult, if not impossible. The dispatcher 120 sends out the requests based on a hard-coded control unit 160 that holds predefined probability sequences representing four normal distributions. The normal distributions are mixed so that every link's total traffic looks constant or similar to the attacker. Of course, fewer or more than four distributions may be used.

As shown in FIG. 4, on the client side, there exists a request blocking filter 310. The filter can block the attacker's abusive requests. Requests 300 include packets sent from a user computer as well as from a hacker. A typical request packet includes a hash value for a suspicious computer file that the user wishes to have analyzed by the cloud service. Filter 310 can block any fake requests inserted by a hacker put in simply to slow down or make the service more expensive. The filter 310, though, cannot block all the disguised or faked requests. For example, if a hacker keeps sending faked requests from the same computer continuously, the filter can easily block that computer. If a hacker, however, uses different computers and sends faked packets intermittently, the filter 310 may let these requests pass through. Accordingly, the present invention provides the threshold-mix batching dispatcher. The incoming requesting packets can be further reduced by the cache 150. If the agent determines that an incoming request has a hash value that is already present in the cache, then no request packet need be sent to the cloud service.

Timer 340 holds a value determined by the timeslot generator 270, which in turn picks a value from one of the distributions using the selected probability sequence. Once the value times out, the packets in the buffer 220 are sent. E.g., if the value is 0.02, then the timer will wait 0.02 seconds (upon receipt of the value) before sending out all packets in the buffer.

The variable length buffer 220 sends the packets according to the generated normal distribution value as mentioned. Every value from the distribution can be treated as a timer. If the timer does not expire, the buffer will hold the requests and the requests are sent out right away when the timer does expire. The exception is if the end of the buffer is reached (all buffers have some finite size), if so, then all packets are sent, whether or not the timer has expired. The pointer 330 in the variable length buffer marks the beginning of the last packet in the buffer and determines if the buffer is close to overflowing or not. No traffic buffer is needed in the dispatcher and buffer 320 is a variable in length instead of being a constant length. The variable length allows a greater number of packets to be batch before dispatching.

Figure 5:
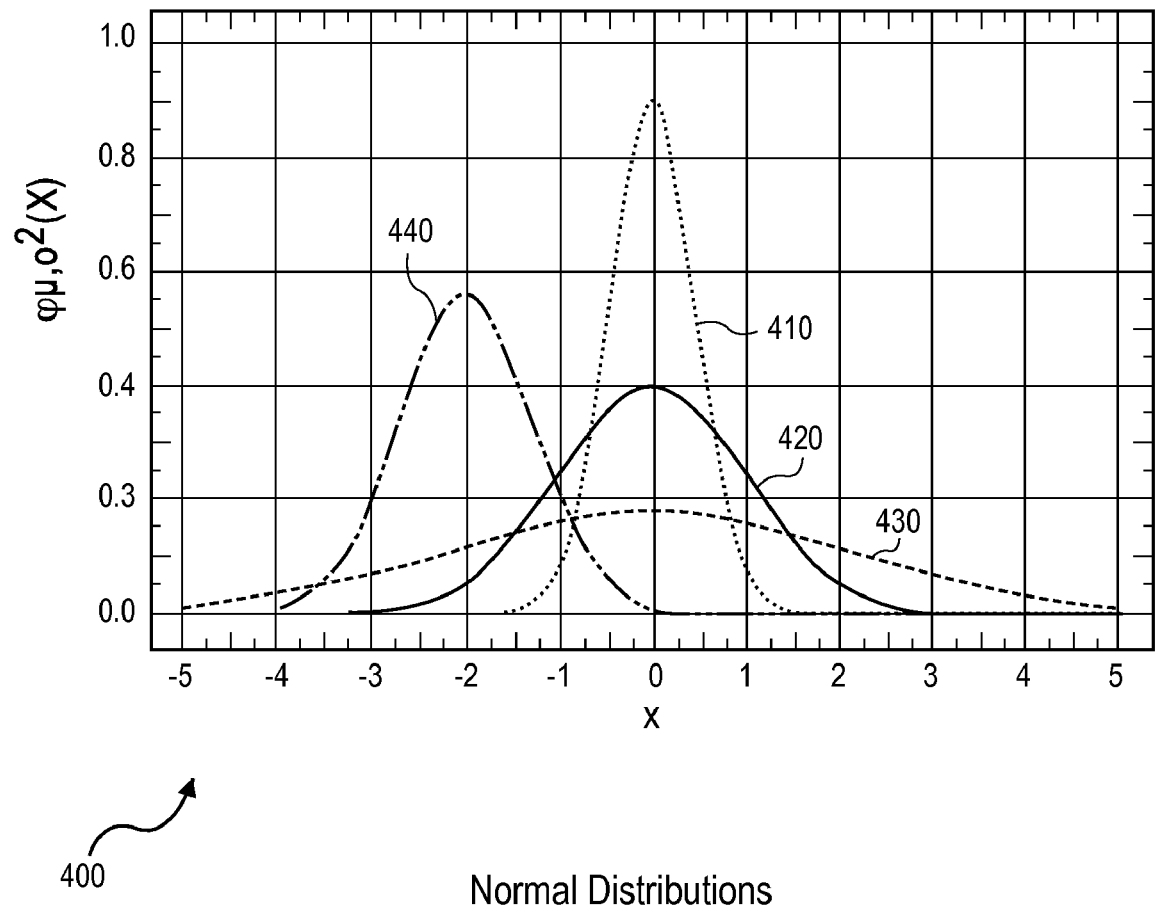
FIG. 5 illustrates an example of four Normal distributions.

FIG. 5 illustrates an example of four Normal distributions. Shown are distributions 410-440. As is known in the art, the Normal distribution is defined as:

$$\frac{1}{\sigma\sqrt{2\pi}}\exp\left(-\frac{(x-\mu)^2}{2\sigma^2}\right)$$

where $\mu$ is the mean, and $\sigma^2$ is the variance.

Flow Diagram for Batching Dispatcher

Figure 6:
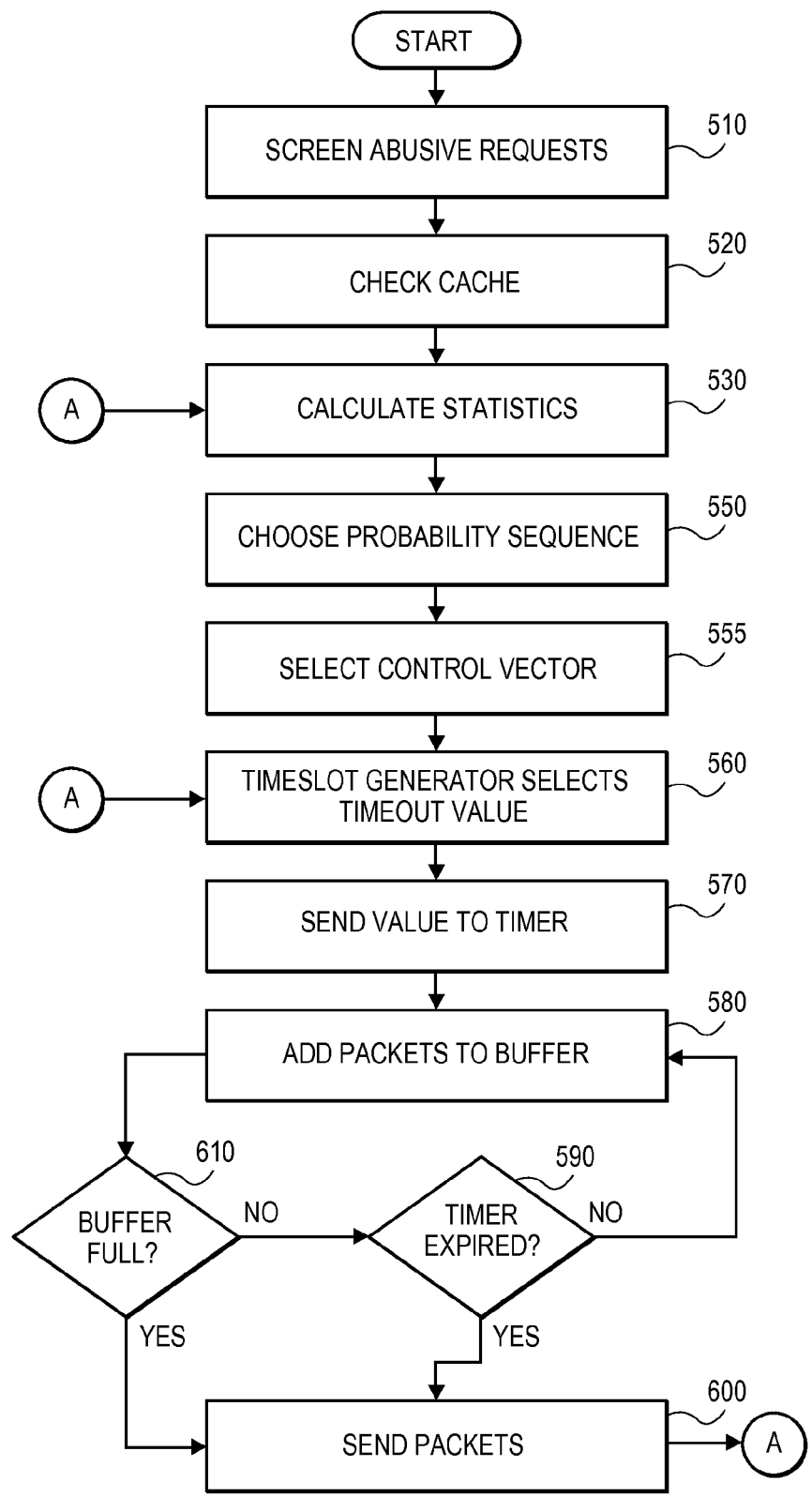
FIG. 6 is a flow diagram describing one embodiment of execution of the batching dispatcher.

FIG. 6 is a flow diagram describing one embodiment of execution of the batching dispatcher. To begin, four (for example) Normal distributions ($\sigma^2$=0.2, 0.5, 1.0, and 5.0) are generated as the distribution candidates. Their values of $\mu$ may be periodically changed, and can be modified based on the changing input packet traffic. We pre-define four probability sequences; for example, "0.3, 0.4, 0.1, 0.2," can be considered as one sequence. The meaning of this sequence is that a probability of 30% is attached to the first distribution, a probability of 40% is attached to the second distribution, etc. Of course, more or fewer than four probability sequences may be used.

It is known that random timeout values can be easily averaged or smoothed. As a result, the hacker's probing traffic may still be measurable by the hacker and traffic analysis can still be a threat to an in-the-cloud service. Therefore, random choices for timeout values are not used, and the techniques provided in the present invention are more advantageous because the hacker will not be able to detect his or her probing traffic.

In step 510 the traffic filter 310 screens out any abusive requests by reference to a reputation database, any IP address, a black list, a white list, or other database query. In step 520 the agent sends the current input request or simply the hash value to the cache 250 to determine if this hash value has already been determined to be malicious. In step 530 the module 210 calculates various statistics of the incoming traffic such as frequency of requests coming from each computer per minute, from which computer requests are coming, arrival time of each request, variance, burstiness degree of a traffic series, etc.

These statistics are used by the control unit (as described below) to determine which probability sequence should be used to mix the distributions and choose a timeout value. Next, these statistics may be stored in a suitable location such as in a table located in the statistic module 210.

In step 550 the control unit 260 takes these statistics and uses them to choose a probability sequence to provide to the timeslot generator which will generate a value for the timer. If the statistics are the same from the last snapshot taken, then no change may be needed. Alternatively, it is possible to resample these statistics every 20 or 30 minutes, or other frequency that may be predefined. For example, as the density of incoming traffic increases (traffic is more "bursty"), a probability sequence may be chosen in step 550 that results in smaller timeout values being provided by the timeslot generator. Thus, packets will be sent faster from the dispatcher (because more packets are arriving more quickly.) The burstiness degree "H" (as well as other statistics such as mean value, variance, etc.) may be determined using any of a number of available tools that are known to those of skill in the art.

For example, based on the input traffic burstiness statistic "H" as follows:

0.5<H<0.65

0.65<H<0.75

0.75<H<0.85

0.85<H<1.0, one of the four probability sequences will be chosen, depending upon which of the four ranges the value "H" falls in.

Different weights to the four normal distributions are assigned by each of the four pre-defined sequences. So, if H is relatively low, meaning that the input traffic is not very bursty, a probability sequence mix is more likely to be chosen that is weighted more heavily toward a distribution having low variance values. For example, distribution 410 has higher values which would result in larger values being used as a timeout number, meaning that the dispatcher waits longer before sending out all packets in the buffer 320 (which is appropriate as the traffic is less dense at this point in time).

In step 555 the control unit 260 assigns a control vector to the chosen probability mix, assigning a "1" to a position where the probability is non-zero, and a "0" where the probability is zero.

In step 560 the timeslot generator uses the new probability sequence mix to select (using the four distributions) a new value for the timer. In one embodiment, the four distributions are effectively mixed into one hybrid distribution using the new probability sequence mix. The next timeout value for the timer is then selected using the hybrid distribution. For example, the generator software will pick a timeout value from one of the distributions whose control values are not zero. In the above example, the control values are (1, 1, 1, 1) for the example sequence of non-zero probability values. Furthermore, the probability of choosing a value from a distribution will satisfy the probabilities in the example sequence of "0.1, 0.15, 0.05, 0.7", that is, there is a 0.1 out of 1 chance that a value will be chosen from the first distribution, a 0.7 out of 1 chance that a value will be chosen from the fourth distribution, etc.

In one embodiment, for each normal distribution, there is a software-based Application Programming Interface (API) call function which will generate a value from the selected distribution each time it is called (once a distribution has been selected as above based upon probability). For example, "call Gen_value( )" is an example of such a call function. When the timer needs to fetch the next timeout value, it calls this function, which returns a value from the distribution that has been selected based upon the probability sequence. This value is then available to be used as the timeout value.

In step 570 this new value is sent to the timer 340. As soon as the timer receives this value, it begins counting down to determine when to send the next group of packets. Preferably, the agent waits to send a new value to the timer once the old timer value has finished and the older group of packets has been set. Once a batch of packets has been sent, a new timer value is received, it begins counting down, and the buffer begins filling up with new packets to be batched. Preferably, the timer begins counting down when the new timeout value is received. Alternatively, the timer may begin counting down when a first packet arrives in the buffer after the timeout value has been received.

In step 580 packets are added to the buffer as they arrive. The pointer 330 is updated as packets arrive. Step 590 checks to see whether the timer has expired. If so, in step 600 all the packets in the buffer are sent. If not, step 610 checks whether the buffer is full. If so, in step 600 all the packets in the buffer are sent. If not, then control returns to step 580 which adds a packet as it arrives. Alternatively, the buffer may be checked first to see if it is full immediately after step 580 and then if not, then the timer is checked to see if it has expired (as shown in FIG. 6). In this alternative, if the timer has not expired then control returns to step number 580, is the timer has expired then the packets are sent.

Once packets are sent in step 600 the dispatcher requests another timer value from the timeslot generator, the generator generates a value as described above, and then the timer value is filled. Once the timer has a new value, it begins counting down from this value to determine when the next group of packets should be sent.

Alternatively, new statistics may be calculated and a new probability sequence generated at any particular time. In one embodiment, control move to step 530 after packets have been sent in step 600 in order to determine a new probability sequence. Preferably, at a predetermined time frequency (such as every 20 or 30 minutes), the module recalculates the statistics and a new probability sequence mix is chosen from among the four available.

Accordingly, the rate of the output traffic from the dispatcher depends upon a selected distribution value by the timeslot generator. If the input traffic rate changes because of a hacker inserting probing traffic, the output traffic rate will be dictated by the value in the timer of the dispatcher, not by any manufactured timing by the attacker. Thus, the output traffic frequency is shaped by the dispatcher; packets may go out faster or slower, thus thwarting an attacker who relies upon their own inserted packet timing.

Computer System Embodiment

Figure 7A:
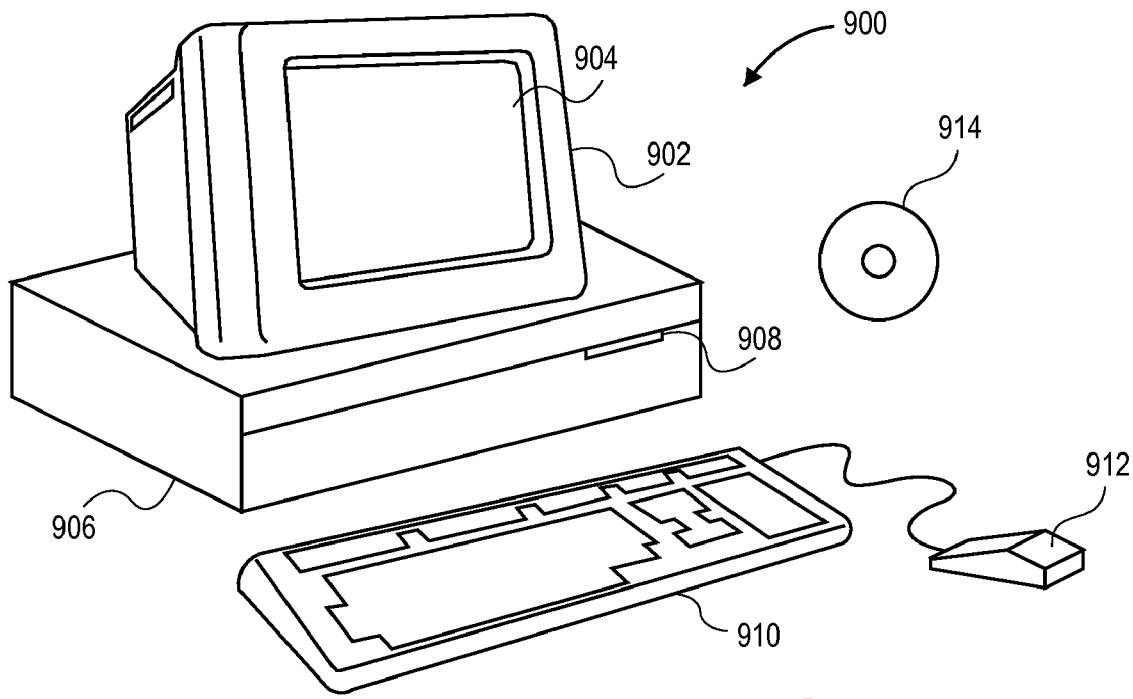
FIGS. 7A and 7B illustrate a computer system suitable for implementing embodiments of the present invention.
Figure 7B:
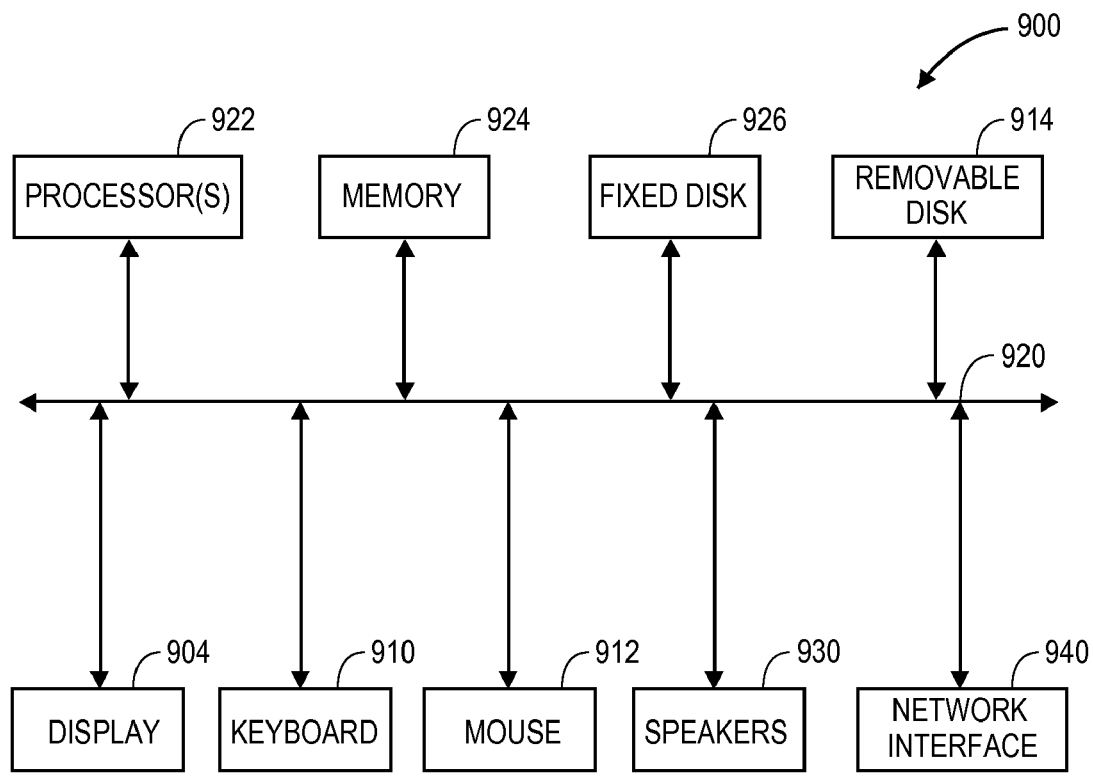

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of dispatching communication packets over a network from a software agent to an Internet server, said method comprising:
 defining a plurality of distributions;
 defining a plurality of probability sequences, each of said probability sequences including a known numerical probability for use with each of said distributions;
 receiving an input stream of communication packets in said software agent, said communication packets originating from at least one user computer and destined for said Internet server;
 storing a portion of said communication packets in a variable length buffer of a dispatcher of said software agent, said dispatcher including a timer but not including a fixed length buffer;
 calculating a statistic based upon said input stream of communication packets;
 choosing one of said probability sequences based upon said statistic after said probability sequences have been defined;
 choosing a value for said timer based upon said chosen probability sequence;
 placing said value into said timer of said dispatcher; and
 sending said communication packets over said network when said timer expires or when said variable length buffer is full.

2. A method as recited in claim 1 wherein said statistic is an input stream burstiness degree H.

3. A method as recited in claim 1 wherein said statistic is the input stream burstiness degree H, whereby said timer value changes as the input traffic density changes.

4. A method as recited in claim 1 wherein said network is a low-latency anonymous network.

5. A method as recited in claim 1 wherein said distributions are Normal distributions.

6. A method as recited in claim 1 wherein said software agent resides upon a user computer, upon a local area network, or upon a standalone hardware device.

7. A method of dispatching communication packets over a network from a software agent to an Internet server, said method comprising:
 receiving an input stream of communication packets in said software agent, said communication packets originating from at least one user computer and destined for said Internet server;
 storing a portion of said communication packets in a variable length buffer of a dispatcher of said software agent, said dispatcher including a timer but not including a fixed length buffer;
 defining a plurality of distributions;
 defining a plurality of probability sequences, each of said probability sequences including a known numerical probability for use with each of said distributions;
 calculating a statistic based upon said input stream of communication packets;
 choosing one of said probability sequences based upon said statistic after said probability sequences have been defined;
 choosing a value from one of said distributions for said timer based upon said chosen probability sequence;
 placing said value into said timer of said dispatcher; and
 sending said communication packets over said network when said timer expires.

8. A method as recited in claim 7 wherein said statistic is an input stream burstiness degree H.

9. A method as recited in claim 7 wherein said statistic is the input stream burstiness degree H, whereby said timer value changes as the input traffic density changes.

10. A method as recited in claim 7 wherein said network is a low-latency anonymous network.

11. A method as recited in claim 7 wherein said distributions are Normal distributions.

12. A method as recited in claim 7 wherein said software agent resides upon a user computer, upon a local area network, or upon a standalone hardware device.

13. A method as recited in claim 7 further comprising:
 sending said communication packets over said network when said timer expires or when said variable length buffer is full.

14. A method of dispatching communication packets over a network from a software agent to an Internet server, said method comprising:
 defining a plurality of distributions;
 defining a plurality of probability sequences, each of said probability sequences including a known numerical probability for use with each of said distributions;
 receiving an indication that a timer associated with a variable length packet buffer in a software agent has expired or that said variable length packet buffer is full, said packet buffer including outgoing communication packets;
 sending said communication packets over said network to said Internet server;
 receiving an input stream of communication packets in said software agent, said input communication packets originating from at least one user computer and destined for said Internet server;
 storing a portion of said communication packets in said variable length packet buffer of said software agent, said software agent not including a fixed length packet buffer;
 calculating a statistic that is dependent upon an input rate of said input stream of communication packets;
 choosing one of said probability sequences based upon said statistic after said probability sequences have been defined;
 choosing a value for said timer based upon said chosen probability sequence; and
 placing said value into said timer of said dispatcher.

15. A method as recited in claim 14 wherein said statistic is an input stream burstiness degree H.

16. A method as recited in claim 14 wherein said statistic is the input stream burstiness degree H, whereby said value for said timer changes as the input traffic density changes.

17. A method as recited in claim 1 wherein said variable length buffer is not padded.

18. A method as recited in claim 7 wherein said variable length buffer is not padded.

19. A method as recited in claim 14 wherein said variable length buffer is not padded.

20. A method as recited in claim 1 further comprising:
defining said plurality of probability sequences before said calculating a statistic.

21. A method as recited in claim 7 further comprising:
defining said plurality of probability sequences before said calculating a statistic.

22. A method as recited in claim 14 further comprising:
defining said plurality of probability sequences before said calculating a statistic.

23. A method as recited in claim 1 wherein said known numerical probability is a fixed value.

24. A method as recited in claim 7 wherein said known numerical probability is a fixed value.

25. A method as recited in claim 14 wherein said known numerical probability is a fixed value.

26. A method as recited in claim 1 further comprising:
assigning a control vector to said chosen probability sequence; and
choosing said value for said timer using a probability of said probability sequence having a non-zero control vector value.

27. A method as recited in claim 7 further comprising:
assigning a control vector to said chosen probability sequence; and
choosing said value for said timer using a probability of said probability sequence having a non-zero control vector value.

28. A method as recited in claim 14 further comprising:
assigning a control vector to said chosen probability sequence; and
choosing said value for said timer using a probability of said probability sequence having a non-zero control vector value.

29. A method as recited in claim 14 wherein said network is a low-latency anonymous network.

* * * * *